United States Patent
Lee et al.

(10) Patent No.: US 9,635,093 B2
(45) Date of Patent: Apr. 25, 2017

(54) SLAVE SIDE TRANSACTION ID BUFFERING FOR EFFICIENT DISTRIBUTED TRANSACTION MANAGEMENT

(71) Applicants: Juchang Lee, Seoul (KR); Chang Gyoo Park, Seoul (KR); Hyoungjun Na, Seoul (KR); Kyuhwan Kim, Anyang (KR)

(72) Inventors: Juchang Lee, Seoul (KR); Chang Gyoo Park, Seoul (KR); Hyoungjun Na, Seoul (KR); Kyuhwan Kim, Anyang (KR)

(73) Assignee: SAP AG, Walldorf (DE)

( * ) Notice: Subject to any disclaimer, the term of this patent is extended or adjusted under 35 U.S.C. 154(b) by 620 days.

(21) Appl. No.: 13/763,920

(22) Filed: Feb. 11, 2013

(65) Prior Publication Data
US 2014/0149527 A1 May 29, 2014

Related U.S. Application Data

(60) Provisional application No. 61/730,847, filed on Nov. 28, 2012.

(51) Int. Cl.
| | | |
|---|---|---|
| *G06F 15/16* | (2006.01) | |
| *H04L 29/08* | (2006.01) | |
| *G06F 17/30* | (2006.01) | |

(52) U.S. Cl.
CPC ........ *H04L 67/10* (2013.01); *G06F 17/30356* (2013.01)

(58) Field of Classification Search
CPC . G06F 9/46; G06F 15/16; G06F 17/30; G06F 13/00
USPC ........ 709/208, 203, 217; 710/105, 110, 703; 707/4, 203, 695
See application file for complete search history.

(56) References Cited

U.S. PATENT DOCUMENTS

| | | | | |
|---|---|---|---|---|
| 6,173,349 B1* | 1/2001 | Qureshi | ................ | G06F 13/364 710/107 |
| 6,457,053 B1* | 9/2002 | Satagopan | ........ | H04L 29/12283 707/999.2 |
| 8,442,962 B2* | 5/2013 | Lee | .......................... | G06F 9/466 707/611 |
| 8,631,169 B2* | 1/2014 | Jin | .......................... | G06F 13/28 710/22 |

(Continued)

*Primary Examiner* — Dhairya A Patel
(74) *Attorney, Agent, or Firm* — Sterne, Kessler, Goldstein & Fox P.L.L.C.

(57) ABSTRACT

Methods, systems and computer-readable storage mediums encoded with computer programs executed by one or more processors for providing a compressed representation of a transaction token are disclosed. In an embodiment, upon a receipt of a request for a write transaction at a slave server it is determined whether there exists an unassigned transaction identifier (TID) stored locally at the slave server as provided by a master server to the slave server prior to the receipt of the write request by the slave server. If there exists an unassigned TID at the slave server, the slave server is configured to assign the unassigned TID to the write transaction, otherwise the slave server is configured to request a plurality of unassigned TIDs from the master server, receive the plurality of unassigned TIDs, and assign one of the received unassigned TIDs to the write transaction. The write transaction is processed.

20 Claims, 4 Drawing Sheets

(56) References Cited

U.S. PATENT DOCUMENTS

| | | | |
|---|---|---|---|
| 8,930,518 B2* | 1/2015 | Dharmalingam | ... H04L 67/2842 709/219 |
| 2002/0049842 A1* | 4/2002 | Huetsch | .................. H04L 29/06 709/225 |
| 2005/0138252 A1* | 6/2005 | Gwilt | ...................... G06F 13/36 710/110 |
| 2005/0165776 A1* | 7/2005 | Focazio et al. | .................... 707/4 |
| 2006/0059282 A1* | 3/2006 | Chaudhary | ......... H04L 67/1097 710/100 |
| 2011/0035294 A1* | 2/2011 | Mizrah | ................... G06F 21/33 705/26.42 |
| 2011/0055313 A1* | 3/2011 | Little | ........................... 709/203 |
| 2011/0202592 A1* | 8/2011 | Hart | ...................... G06F 21/313 709/203 |
| 2012/0166407 A1* | 6/2012 | Lee | ................... G06F 17/30371 707/703 |
| 2012/0167098 A1* | 6/2012 | Lee et al. | ...................... 718/101 |
| 2013/0304714 A1* | 11/2013 | Lee | ......................... G06F 9/466 707/703 |
| 2014/0006875 A1* | 1/2014 | Vedula | ................ G06F 11/3068 714/45 |
| 2014/0149368 A1* | 5/2014 | Lee et al. | ...................... 707/695 |

* cited by examiner

"SLAVE SIDE TRANSACTION ID BUFFERING FOR EFFICIENT DISTRIBUTED TRANSACTION MANAGEMENT"

CROSS-REFERENCE TO RELATED APPLICATION

This application claims the benefit under 35 U.S.C. §119 of U.S. Provisional Application No. 61/730,847, filed Nov. 29, 2012, which is hereby incorporated by reference in its entirety.

FIELD

The present embodiments are generally related to the field of distributed transaction management.

BACKGROUND

A multi-version concurrency control (MVCC) database often has many transactions simultaneously accessing or seeking to access the data of the database. MVCC databases simultaneously maintain multiple versions of data which are accessed by read and write transactions. A database often operates on or across multiple servers, one of which is designated as the master server and the rest of which are referred to as slave servers. Each time a request for a write transaction is received by a slave serve, a transaction identifier must be requested font the master server prior to executing the write transaction. The required process of individually requesting and responding to each request for a transaction identifier for each incoming write transaction adds additional overhead to the database processing which results in the consumption of additional resources and/or the slowdown of database processing.

BRIEF SUMMARY

Some aspects of the subject matter described in this specification may be embodied in a computer-implemented method. As part of the method, upon a receipt of a request for a write transaction at a slave server it is determined whether there exists an unassigned transaction identifier (TID) stored locally at the slave server as provided by a master server to the slave server prior to the receipt of the write request by the slave server. If there exists an unassigned TID at the slave server, the slave server is configured to assign the unassigned TID to the write transaction. If there does not exist an unassigned TID at the slave server, the slave server is configured to request a plurality of unassigned TIDs from the master server, receive the plurality of unassigned TIDs locally at the slave server, and assign one of the received unassigned TIDs to the write transaction. The write transaction is processed.

Other embodiments described herein include corresponding systems, apparatus, and computer programs, configured to perform the actions of the methods, encoded on computer storage devices. Further embodiments, features, and advantages, as well as the structure and operation of the various embodiments are described in detail below with reference to accompanying drawings.

BRIEF DESCRIPTION OF THE DRAWINGS/FIGURES

The accompanying drawings, which are incorporated herein and form a part of the specification, illustrate exemplary embodiments and, together with the description, further serve to explain the principles of the disclosure and to enable a person skilled in the relevant art(s) to make and use the contemplated and disclosed embodiments.

DETAILED DESCRIPTION

Embodiments are described herein with reference to illustrations for particular applications. It should be understood that the embodiments are not intended to be limiting. Those skilled in the art with access to the teachings provided herein will recognize additional modifications, applications, and embodiments within the scope thereof and additional fields in which the embodiments would be of significant utility.

A database often has many transactions simultaneously accessing or seeking to access the data of the database. These transactions include both read and write transactions.

In some database configurations, only a single version of data is ever maintained. For example, when a write transaction is completed, the previous data, as existing prior to the write transaction, is discarded or otherwise replaced with the new data as it exists after the write transaction. Thus, in essence, maintaining only a single version of the data.

However, there exist other database configurations in which multiple versions of data are maintained. These multi-version databases are commonly referred to as multi-version concurrency control (MVCC) databases. MVCC databases insert or store new versions of data in the database and may simultaneously maintain multiple differing versions of data of the database. MVCC databases do not generally overwrite existing versions, unless, for example, an existing version is deemed to be no longer used or out of date. For purposes of this description, it is understood that the term database is referring to a MVCC database, or other databases with similar relevant characteristics. If a single version database is referred to herein, it shall be referred to explicitly as such. Also, data version and database version are used interchangeably.

To keep track of the multiple data versions that may simultaneously exist, databases may use timestamps that are associated with each version. A timestamp could include any indicator that indicates which data values are included in a particular data version. For example, a timestamp may indicate when a data version was created/stored, or which transactions have been committed to the database and should be included in the data version.

A database system is often operated on or distributed across multiple computing devices or machines, such as servers. When database processing is performed across multiple servers, one of the servers may be designated a master server to control or regulate the overall processing, and the remaining machines may be designated as slave servers. The master server will operate to coordinate the processing of transactions (e.g., write and read transactions) requesting access to data of the database, including determining which versions of data are available or are otherwise being accessed.

Figure 1:
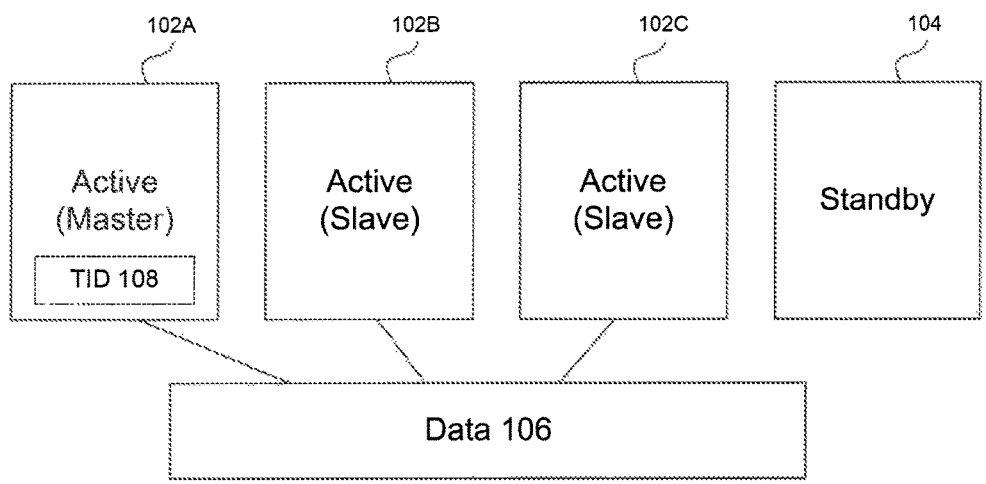
FIG. 1 illustrates an example of a distributed database system, according to an embodiment.

FIG. 1 illustrates an example of a distributed database system 100, according to an embodiment. System 100 includes active database servers 102A-C and a standby server 104. One skilled in the art recognizes that other embodiments may include varying numbers of active servers 102 and standby servers 104. Servers 102, 104 may be geographically located near each other, or distributed over a wide geographic region.

Standby server 104 may serve as a backup in case one of active servers 102A-C fails, or may otherwise be activated if a large volume or processing is requested. Each active server 102A-C may have its own separate persistency, such as a data log and files, but standby server 104 may require a shared storage.

As shown, among active servers 102A-C, server 102A may be designated as being the active master server (master server), while the other active servers 102B, 102C are designated as active slave servers (slave servers). Master server 102A may serve as a transaction coordinator amongst servers 102A-C and may also provide for metadata persistency. In an embodiment, any active server 102 may accept a read or write transactions request from an application, user, or other client seeking to access data 106 of the database.

For write transactions however, slave servers 102B, 102C must request (or otherwise be configured to request) a transaction identifier (TID) 108 from master server 102A. Master server 102A may then assign TID 108 to the requesting slave server 102B, 102C. The receiving slave server 102B, 102C may then assign TID 108 to the accepted write request and process, execute, or otherwise allow the write request to process or execute.

Figure 2:
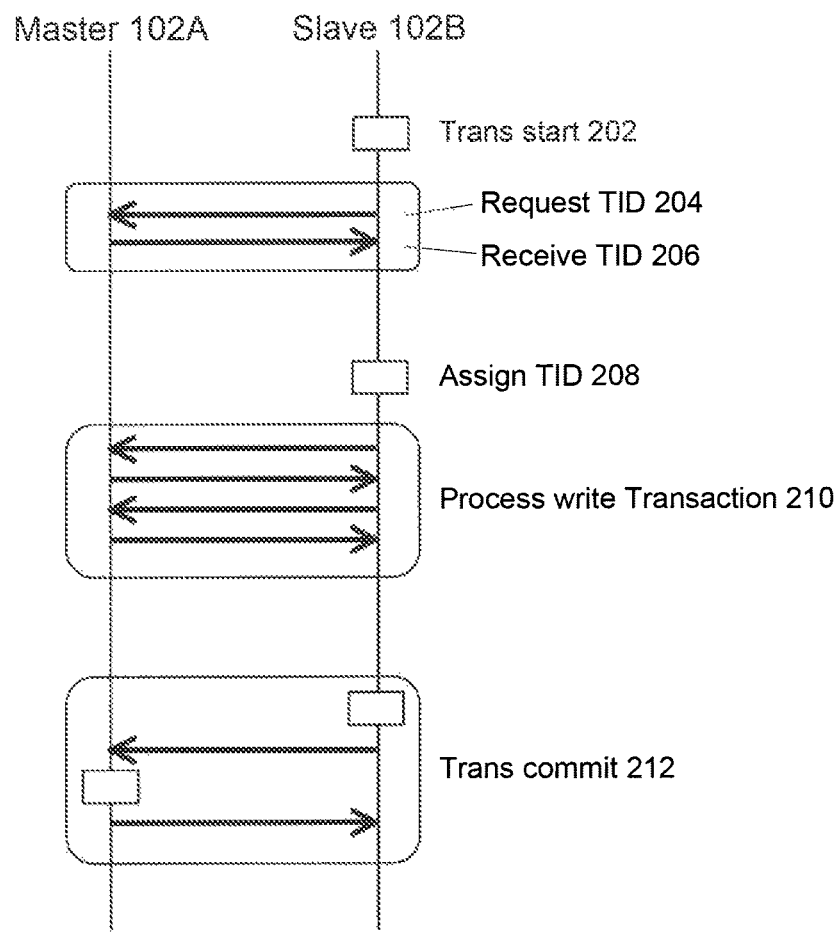
FIG. 2 illustrates a sequence of steps on how a write transaction is started from a slave server, according to an embodiment.

FIG. 2 illustrates a sequence of steps on how a write transaction is started from a slave server 102B, according to an embodiment. At stage 202, a client request for a write transaction may be received by and accepted by or otherwise assigned to slave server 102B. At stage 204, a TID (108) is requested from master server 102A.

Master server 102A may have a transaction coordinator that assigns TIDs to write requests. The transaction coordinator may track which transactions are open/closed using a transaction token (TT). Upon receipt of the write request, the transaction coordinator may assign and return a TID for the write request.

At stage 206, TID 108 is received from master server 102A by slave server 102B. At stage 208, slave server 102B assigns the TID to the write request. At stage 210, slave server 102B may then process or execute the write request. The processing may require some back and forth processing with master server 102A or another machine or server.

At stage 212, the write transaction is committed by slave server 102B and an acknowledgement or notification of commit is provided to master server 102A. The notification can include a completion signal to the transaction coordinator indicating that the write transaction with the assigned TID (as received at stage 206) has completed and been committed to the database. Master server 102A may receive this acknowledgment and mark the transaction as being completed or committed. In another embodiment, slave server 102B may wait until it receives an acknowledgement from the transaction coordinator prior to committing the changes to the database.

In a conventional database system, at stage 204 only a single TID is requested by slave server 102B and is provided by the master server 102A at a time. As such, the problem facing conventional systems is that a new TID must be requested each time an incoming write request is accepted or otherwise received by slave server 102B. This can add costly processing time to conventional database systems. For example, if slave server 102B receives ten write requests, conventional systems require ten separate round trip communications between slave server 102B and master server 102A, to request and receive the ten individual TIDs required for the ten write requests.

Figure 3:
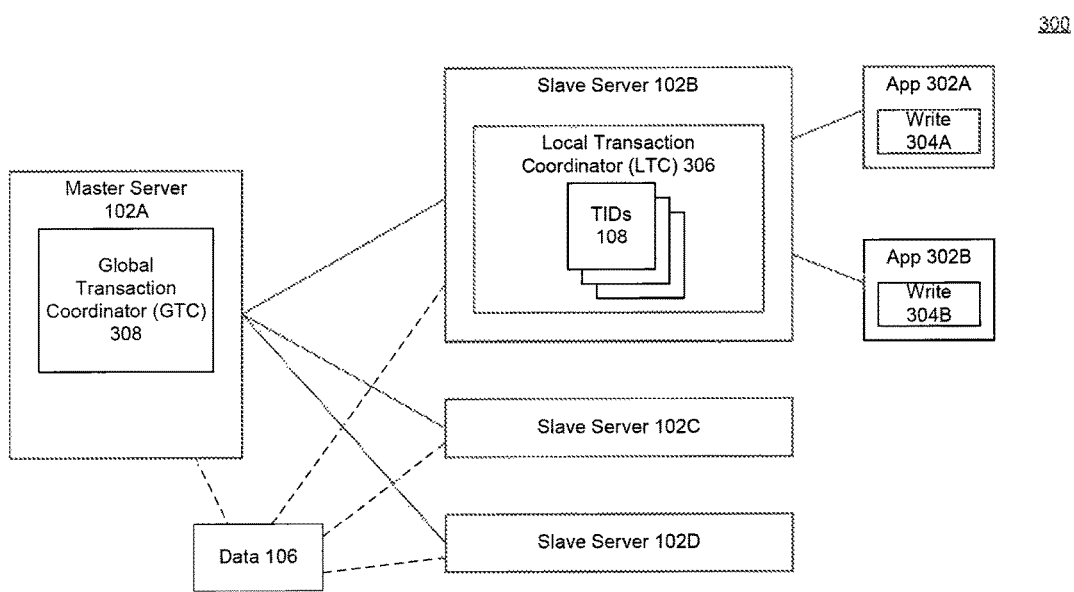
FIG. 3 illustrates an example database system for slave side transaction ID buffering.

FIG. 3 illustrates an example database system 300 for slave side transaction ID buffering. System 300 includes master server 102A and multiple slave servers 102B-102D. Each server 102A-D may interact with, or receive requests from one or more applications, users, or systems, hereinafter referred to as apps 302 trying to access data 106. System 300 shows apps 302A and 302B accessing slave server 102B. However it may be understood that each active server 102A-D may include connections to or communications with any number of apps 302, each of which may access one or more of active servers 102A-D. It is understood that each slave server 102B-102D may include a configuration such as that described with regards to slave server 102B below.

Slave server 102B may include a local transaction coordinator (LTC) 306, Contrary to conventional database systems, which must request a single TID 108 upon the receipt of a write request or transaction 304A, 304B from an app 302A, 302B, slave server 102B may request and/or store multiple TIDs 108, which are managed by LTC 306.

Upon the receipt or acceptance of write request 304A from app 302A, LTC 306 may first check a local store to determine if any local TIDs 108 are already available at slave server 102B for assignment to write 304A. If an unassigned TID 108 exists locally at slave server 102B, LTC 306 assigns the next (e.g., sequentially next with numbered TIDs) TID 108 to write 304A. Write 304A may then be processed by or otherwise allowed to be processed by slave server 102B.

If, however, no unassigned TID 108 exists locally on slave server 102B, LTC 306 may request a new batch of TIDs 108 from a global transaction coordinator (GTC) 308 operating on master server 102A. GTC 308 may generate or otherwise assign multiple pre-generated TIDs 108 to slave server 102B. GTC 308 may either provide a requested number, previously designated number, or dynamically determined number of TIDs 108 to LTC 106. Often, though not necessarily, the assigned TIDs 108 of a batch will be sequentially numbered.

In an embodiment, if a local TID 108 has been assigned to write 304A, LTC 306 may check to see if the number of TIDs 108 stored locally on slave server 102B has dropped below a threshold for a minimum number of local TIDs to be stored on slave server 102B. The threshold may indicate when a request for new TIDs 108 may be sent, such that slave server 102B does not run out of TIDs 108. Threshold may be set to zero.

With regards to the description of FIG. 2, at stage 204 slave server 102B (as shown in FIG. 3) may request multiple TIDs 108 at a time, or otherwise receive at stage 206 multiple TIDs 108. This is in contrast to conventional systems which may only request/receive a single TID at a time.

LTC 306 may request ten or twenty (or any other number of TIDs 108 at a time. GTC 308 may then assign the requested number of TIDs 108 to slave server 102B or LTC 306. LTC 306 would then manage or assign TIDs 108 as provided by GTC 308 to incoming/accepted write requests 304A, 304B. When the number of TIDs 108 drops to zero, or below a specified threshold, additional TIDs 108 may be requested for future write requests.

In an embodiment, each slave server 102B-102D may request a different number of TIDs 108. The number of TIDs 108 may be set ahead of time, or dynamically determined and/or modified during runtime. For example, a TID batch request may request five TIDs at a time. However, during processing it may be determined that a particular slave server generally receives eight write requests 304A over short periods of time. As such, to improve efficiency, the number of requested TIDs may be increased to eight. Or, for example, the number of provided TIDs 108 may vary based on the time of day or anticipated workload of a server. For example, during off peak hours, fewer TIDs 108 may be provided than during peak hours.

In an embodiment, after the last local TID 108 is assigned to a write transaction request 304, LTC 306 may request an additional batch of TIDs 108 prior to the acceptance of any additional write transactions 304. Or, for example, the LTC 306 may wait until a subsequent write transaction 304 is received or accepted before requesting any additional TIDs 108.

Figure 4:
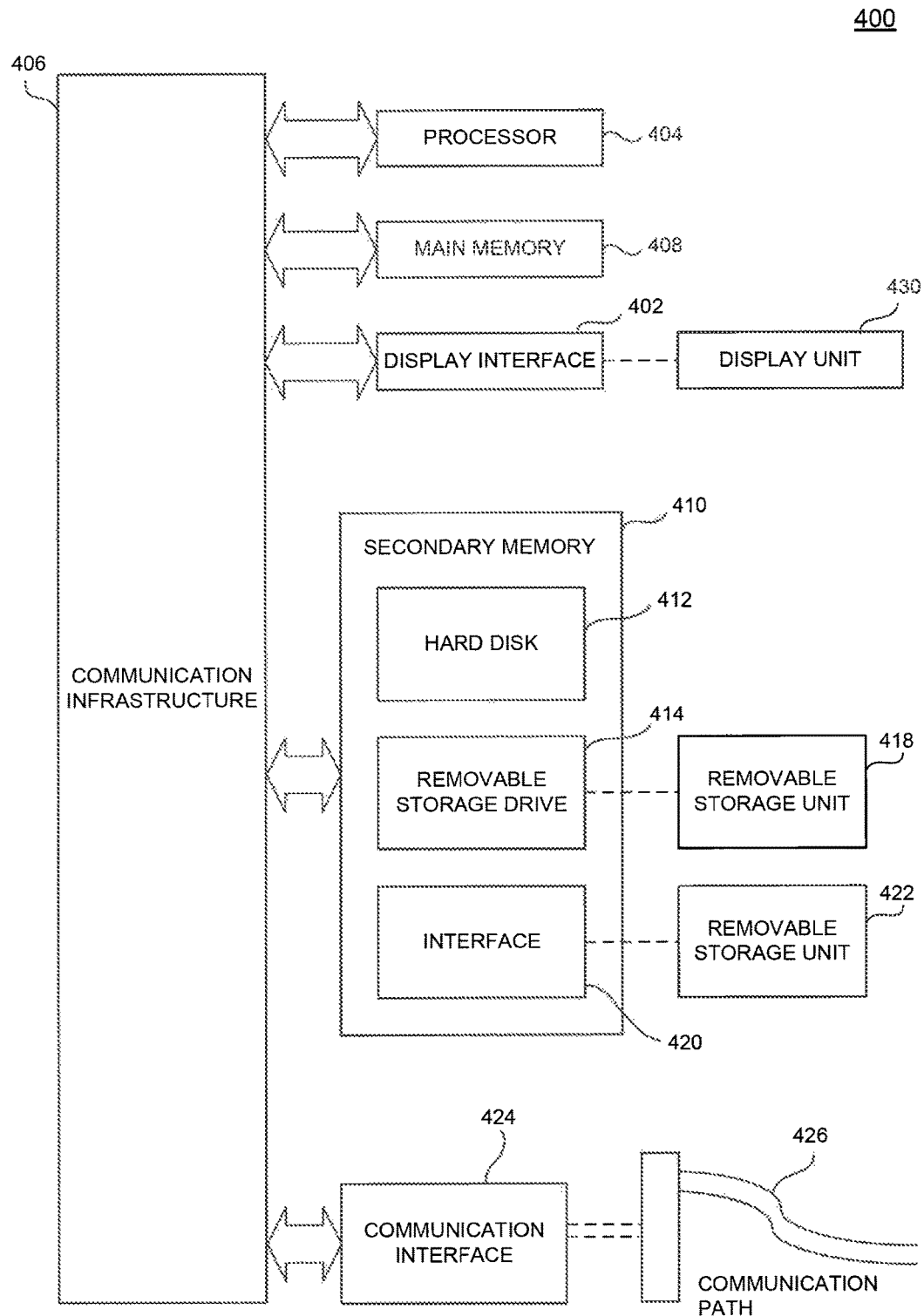
FIG. 4 illustrates an example computer system in which embodiments as described herein, or portions thereof, may be implemented.

FIG. 4 illustrates an example computer system 400 in which embodiments as described herein, or portions thereof, may be implemented as computer-readable code. For example, the database systems 100 and 300 methods related thereto, may be implemented in computer system 400 using hardware, software, firmware, tangible computer readable media having instructions stored thereon, or a combination thereof, and may be implemented in one or more computer systems or other processing systems.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments are described in terms of this example computer system 400. After reading this description, it will become apparent to a person skilled in the relevant art how to implement the embodiments using other computer systems and/or computer architectures. Although some operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 404 may be a single processor in a multi-core/multiprocessor system, such system may be operating alone, or in a cluster of computing devices operating in a cluster or server farm. Processor device 404 is connected to a communication infrastructure 406, for example, a bus, message queue, network, or multi-core message-passing scheme.

Computer system 400 also includes a main memory 408, for example, random access memory (RAM), and may also include a secondary memory 410. Main memory 408 may include any kind of tangible memory. Secondary memory 410 may include, for example, a hard disk drive 412, and a removable storage drive 414. Removable storage drive 414 may include a floppy disk drive, a magnetic tape drive, an optical disk drive, a flash memory, or the like. The removable storage drive 414 reads from and/or writes to a removable storage unit 418 in a well-known manner. Removable storage unit 418 may include a floppy disk, magnetic tape, optical disk, etc. which is read by and written to by removable storage drive 414. As will be appreciated by persons skilled in the relevant art, removable storage unit 418 includes a computer readable storage medium having stored therein computer software and/or data.

Computer system 400 (optionally) includes a display interface 402 (which can include input and output devices such as keyboards (e.g., 104), mice, etc.) that forwards graphics, text, and other data from communication infrastructure 406 (or from a frame buffer not shown) for display on display unit 430.

In alternative implementations, secondary memory 410 may include other similar I/O ways for allowing computer programs or other instructions to be loaded into computer system 400, such as a removable storage unit 422 and an interface 420. Examples may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices, Communications interface 424 may include a modem, a network interface (such as an Ethernet card), a communications port, a PCMCIA slot and card, or the like. Software and data transferred via communications interface 424 may be in the form of storage-incapable signals, which may be electronic, electromagnetic, optical, or other signals capable of being received by communications interface 424. These signals may be provided to communications interface 424 via a communications path 426. Communications path 426 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 418, removable storage unit 422, and a hard disk installed in hard disk drive 412. Computer storage medium and computer readable storage medium may also refer to memories, such as main memory 408 and secondary memory 410, which may be memory semiconductors (e.g. DRAMs, etc.). Such mediums include non transitory storage mediums.

Computer programs (also called computer control logic) are stored in main memory 408 and/or secondary memory 410. Computer programs may also be received via communications interface 424. Such computer programs, when executed, enable computer system 400 to implement embodiments as discussed herein. Where the embodiments are implemented using software, the software may be stored in a computer program product and loaded into computer system 400 using removable storage drive 414, interface 420, and hard disk drive 412, or communications interface 424.

Embodiments also may be directed to computer program products comprising software stored on any computer readable medium. Such software, when executed in one or more data processing device, causes a data processing device(s) to operate as described herein. Embodiments may employ any computer readable storage medium. Examples of computer readable storage mediums include, but are not limited to, primary storage devices (e.g., any type of random access memory), and secondary storage devices (e.g., hard drives, floppy disks, CD ROMS, ZIP disks, tapes, magnetic storage devices, and optical storage devices, MEMS, nanotechnological storage device, etc,).

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The Summary and Abstract sections may set forth one or more but not all exemplary embodiments contemplated, and thus, are not intended to limit the described embodiments or the appended claims in any way.

Various embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept as described herein. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method comprising:
   determining by a local transaction coordinator (LTC) operating on a slave sever, upon a receipt of a request for a write transaction at the slave server, whether there exists an unassigned transaction identifier (TID) stored locally at the slave server as provided by a master server to the slave server prior to the receipt of the write request by the slave server;
   configuring the LTC of the slave server, based on a determination that the unassigned TID exists at the slave server, to:
     assign the unassigned TID to the write transaction,
     determine that a number of remaining unassigned TIDs, after the configured slave server assigns the TID to the write transaction, is below a threshold, and
     request a plurality of unassigned TIDs prior to a receipt of a subsequent write request;
   configuring the LTC of the slave server, based on a determination that the unassigned TID does not exist at the slave server, to:
     request a plurality of unassigned TIDs from the master server,
     receive the plurality of unassigned TIDs locally at the slave server, and
     assign one of the received unassigned TIDs to the write transaction; and
   processing the write transaction.

2. The method of claim 1, further comprising:
   determining that a number of remaining unassigned TIDs, after the assigning by the configured LTC of the slave server, is below a threshold; and
   requesting, from the master server, the plurality of unassigned TIDs upon a receipt of a subsequent write request.

3. The method of claim 1, further comprising:
   determining that the write transaction has completed processing; and
   providing an indication to the master server that the write transaction has completed.

4. The method of claim 1, further comprising:
   requesting, prior to the processing, a copy of a transaction token maintained by the master server, indicating which data version of a database is accessible to the write request.

5. The method of claim 1, wherein the requesting comprises:
   determining a number of unassigned TIDs to request; and
   requesting the determined number of TIDs.

6. The method of claim 1, wherein the receiving comprises:
   determining that the plurality of received unassigned TIDs includes a sequence of integers.

7. The method of claim 1, further comprising:
   receiving a subsequent plurality of unassigned TIDs from the master server, wherein a number of unassigned TIDs in the plurality of unassigned TIDs varies from a number of unassigned TIDs in the subsequent plurality of unassigned TIDs.

8. The method of claim 1, wherein the slave server locally buffers one or more unassigned TIDs prior to receiving one or more write requests to which the TIDs are assigned.

9. A system comprising:
   a master server including a processor and memory, including a global transaction coordinator (GTC) operating on the master server of a database system;
   a slave server including a processor and memory, including a local transaction coordinator (LTC) operating on the slave server of the database system;
   the LTC being configured to:
     receive a request for a write transaction, determine, upon the receipt of the request, whether there exists an unassigned transaction identifier (TID) at the slave server as provided by the GTC prior to the receipt of the write request;

based on a determination that the unassigned TID exists at the slave server, the LTC server is configured to:
assign the unassigned TID to the write transaction if there exists the unassigned TID at the slave server,
determine that a number of remaining unassigned TIDs, after the configured slave server assigns the TID to the write transaction, is below a threshold, and
request, from the GTC, a plurality of unassigned TIDs prior to a receipt of a subsequent write request;

based on a determination that the unassigned TID does not exist at the slave server, the LTC server is configured to:
request, from the GTC, a plurality of unassigned TIDs,
receive the plurality of unassigned TIDs at the slave server, and
assign one of the received unassigned TIDs to the write transaction; and wherein the slave server is configured to process the write transaction after the unassigned TID has been assigned to the write transaction.

10. The system of claim 9, wherein the LTC is further configured to:
determine that a number of remaining unassigned TIDs, after the assigning by the LTC, is below a threshold; and
request, from the GTC, the plurality of unassigned TIDs upon a receipt of a subsequent write request.

11. The system of claim 9, wherein the LTC is further configured to:
determine that the write transaction has completed processing; and
provide an indication to the GTC that the write transaction has completed.

12. The system of claim 9, wherein the LTC is further configured to:
request, prior to the processing, a copy of a transaction token maintained by the GTC, indicating which data version of a database is accessible to the write request.

13. The system of claim 9, wherein the LTC is configured to request is configured to:
determine a number of unassigned TIDs to request; and
request the number of unassigned TIDs.

14. The system of claim 9, wherein the LTC is configured to receive the plurality of transaction identifiers is configured to:
determine that the plurality of received unassigned TIDs includes a sequence of integers.

15. The system of claim 9, wherein the LTC is further configured to:
receive a subsequent plurality of unassigned TIDs from the GTC, wherein a number of unassigned TIDs in the plurality of identifiers varies from a number of unassigned TIDs in the subsequent plurality of unassigned TIDs.

16. The system of claim 9, wherein the GTC is configured to, upon receiving the request for the plurality of unassigned TIDs, determine how many TIDs to provide to the LTC based on an anticipated workload of the slave server.

17. A non-transitory computer-readable storage device having computer-executable instructions stored thereon, execution of which, by a computing device, causes the computing device to perform operations comprising:
determining by a local transaction coordinator (LTC) operating on a slave sever, upon a receipt of a request for a write transaction at the slave server, whether there exists an unassigned transaction identifier (TID) at the slave server as provided by a master server prior to the receipt of the write request;

configuring the LTC of the slave server, based on a determination that the unassigned TID exists at the slave server, to:
assign the unassigned TID to the write transaction,
determine that a number of remaining unassigned TIDs, after the configured slave server assigns the TID to the write transaction, is below a threshold, and
request a plurality of unassigned TIDs prior to a receipt of a subsequent write request;

configuring the LTC of the slave server, based on a determination that the unassigned TID does not exist at the slave server, to:
request a plurality of unassigned TIDs from the master server,
receive the plurality of unassigned TIDs locally at the slave server, and
assign one of the received unassigned TIDs to the write transaction; and processing the write transaction.

18. The non-transitory computer-readable storage device of claim 17 having computer-executable instructions stored thereon that cause the LTC of the slave server to assign the unassigned TID to the write transaction based on the determination that the unassigned TID exists at the slave server further comprising instructions to:
determining, after the assigning, that a number of remaining unassigned TIDs is below a threshold; and
requesting, from the master server, the plurality of unassigned TIDs prior to a receipt of a subsequent write request.

19. The non-transitory computer-readable storage device of claim 17 wherein the memory further comprises code that when executed cause the computing device to perform operations comprising:
determining, after the assigning, that a number of remaining unassigned TIDs is below a threshold; and
requesting, from the master server, the plurality of unassigned TIDs upon a receipt of a subsequent write request.

20. The non-transitory computer-readable storage device of claim 17 wherein the memory further comprises code that when executed cause the computing device to perform operations comprising:
determining that the write transaction has completed processing; and
providing an indication to the master server that the write transaction has completed.

* * * * *